United States Patent
Arshad et al.

(10) Patent No.: US 12,301,537 B2
(45) Date of Patent: May 13, 2025

(54) CLIENT NETWORK CONFIGURATION

(71) Applicant: McLaren Applied Limited, Woking (GB)

(72) Inventors: Sohail Arshad, Woking (GB); Daniel Steer, Woking (GB)

(73) Assignee: McLaren Applied Limited, Woking (GB)

( * ) Notice: Subject to any disclaimer, the term of this patent is extended or adjusted under 35 U.S.C. 154(b) by 0 days.

(21) Appl. No.: 18/720,002

(22) PCT Filed: Sep. 18, 2023

(86) PCT No.: PCT/GB2023/052412
§ 371 (c)(1),
(2) Date: Jun. 14, 2024

(87) PCT Pub. No.: WO2024/057045
PCT Pub. Date: Mar. 21, 2024

(65) Prior Publication Data
US 2025/0063018 A1  Feb. 20, 2025

(30) Foreign Application Priority Data
Sep. 16, 2022  (GB) .................................. 2213615

(51) Int. Cl.
*H04B 7/02* (2018.01)
*H04L 61/5007* (2022.01)
*H04L 61/5061* (2022.01)

(52) U.S. Cl.
CPC ...... *H04L 61/5061* (2022.05); *H04L 61/5007* (2022.05)

(58) Field of Classification Search
None
See application file for complete search history.

(56) References Cited

U.S. PATENT DOCUMENTS

| | | |
|---|---|---|
| 2006/0180709 A1 | 8/2006 | Breton et al. |
| 2012/0316708 A1 | 12/2012 | Kraeling et al. |

(Continued)

FOREIGN PATENT DOCUMENTS

| | | | |
|---|---|---|---|
| GB | 2523394 | 8/2015 | |
| WO | WO 2018/152491 | 8/2018 | |
| WO | WO-2021176151 A1 * | 9/2021 | ............. H04L 67/12 |

OTHER PUBLICATIONS

Aboba et al., "The Mini DHCP Server," Network Working Group, Internet-Draft, <draft-aboba-dhc-mini-04.text>, Sep. 29, 2001, 12 pages.

(Continued)

*Primary Examiner* — Christopher B Robinson
(74) *Attorney, Agent, or Firm* — Fish & Richardson P.C.

(57) ABSTRACT

A method for establishing a client network on a vehicle, the vehicle comprising a plurality of antenna units, each antenna unit comprising a first communications interface having a hardware address, each first communication interface being connected to a communication network, the method comprising, at a first antenna unit: communicating over the communication network using a first interface address associated with the first communication interface to identify at least one other antenna unit using a self-discovery protocol, the first interface address being generated by the first antenna unit; communicating with the at least one other antenna unit to designate a master antenna unit based on a priority order of the antenna units; in response to the first antenna unit being designated the master antenna unit, generating a first address allocation server to allocate respective second interface addresses to the at least one other antenna unit to be used in communication between the plurality of antenna units; and generating a second address allocation server to allocate respective third interface addresses from a subset of a set of third interface addresses (Continued)

to at least one client device connected to the client network, different subsets of the set of third interface addresses being allocated to second address allocation servers of respective antenna units.

17 Claims, 3 Drawing Sheets

(56) References Cited

U.S. PATENT DOCUMENTS

| | | | | |
|---|---|---|---|---|
| 2015/0173067 A1* | 6/2015 | Dinan | ................... | H04W 12/10 |
| | | | | 370/329 |
| 2015/0264554 A1* | 9/2015 | Addepalli | ............. | H04W 76/45 |
| | | | | 370/328 |
| 2016/0316353 A1* | 10/2016 | Kawakami | .......... | H04L 61/5007 |
| 2018/0375721 A1* | 12/2018 | Rondeau | ............. | H04L 61/5014 |
| 2020/0351238 A1 | 11/2020 | Kandasamy et al. | | |

OTHER PUBLICATIONS

Akinlar et al., "Mini-DHCP Election Option for DHCP," Network Working Group, Internet-Draft, <draft-akinlar-zeroconf-minidhcp-option-00.txt>, Mar. 5, 2000, 5 pages.
International Search Report and Written Opinion in International Appln. No. PCT/GB2023/052412, mailed on Oct. 20, 2023, 14 pages.
Narten et al.,"Neighbor Discovery for IP version 6 (IPv6)," Network Working Group, RFC 4861, Sep. 2007, 97 pages.
Search Report in GB Appln. No. 2213615.4, mailed on Mar. 2, 2023, 3 pages.

* cited by examiner

CLIENT NETWORK CONFIGURATION

CROSS-REFERENCE TO RELATED APPLICATIONS

The present application is the national stage entry of International Application No. PCT/GB2023/052412, filed on Sep. 18, 2023, and claims priority to Application No. GB 2213615.4, filed in the United Kingdom on Sep. 16, 2022, the disclosures of which are expressly incorporated herein in their entirety by reference thereto.

TECHNICAL FIELD

This invention relates to a method for establishing a client network on a vehicle and a a first antenna unit provided on a vehicle.

BACKGROUND

Typical communications systems on a vehicle, such as a train, utilise one or two gateways. The vehicle may comprise multiple segments that have been joined together. For instance, a train comprises multiple carriages that have been coupled together.

Each gateway has access to an external network, such as the internet, to provide connectivity services to users on the vehicle. These users may have one or more client devices that require access to the external network. Each gateway can connect to the external network using a cellular modem. In this way, the gateways are configured to provide access to the client devices over the cellular network to the external network. The gateways may share bandwidth between them to improve the reliability and connection speed for the client devices.

Typically, these gateways are manually configured when they are installed on the vehicle. Part of this configuration is to establish links between the multiple gateways present on the vehicle and setting up redundancy between them. In addition, these gateways tend to be installed within the vehicle with at least one passive roof antenna for each gateway fitted to the roof of the vehicle. Multiple antennas may be required depending on the number of mobile networks and MIMO configuration that needs to be supported. This means the gateways need to be installed in segments of the vehicle where access to the roof antennas is available. Usually the connection between the gateways and the roof antennas involves connections using RF cables and RF splitters which have a detrimental impact on the signals sent and received by the antenna and gateway.

The typical installation of the antennas and gateways on a vehicle are time consuming to install and set up. As they are manually configured, a change in the formation of the vehicle (such as a replacement carriage on a train) required the gateways to be manually reconfigured to re-establish cross communication and redundancy. In addition, it is problematic finding a location for the gateway device within the vehicle and routing the RF cabling to the roof of the vehicle.

It is therefore desirable for there to be an improved method of establishing a client network on a vehicle.

SUMMARY

According to a first aspect of the present invention there is provided a method for establishing a client network on a vehicle, the vehicle comprising a plurality of antenna units, each antenna unit comprising a first communications interface having a hardware address, each first communication interface being connected to a communication network, the method comprising, at a first antenna unit: communicating over the communication network using a first interface address associated with the first communication interface to identify at least one other antenna unit using a self-discovery protocol, the first interface address being generated by the first antenna unit; communicating with the at least one other antenna unit to designate a master antenna unit based on a priority order of the antenna units; in response to the first antenna unit being designated the master antenna unit, generating a first address allocation server to allocate respective second interface addresses to the at least one other antenna unit to be used in communication between the plurality of antenna units; and generating a second address allocation server to allocate respective third interface addresses from a subset of a set of third interface addresses to at least one client device connected to the client network, different subsets of the set of third interface addresses being allocated to second address allocation servers of respective antenna units.

The priority order may be based on the respective hardware addresses of the first communication interfaces. The antenna may have the highest or lowest hardware address is designated as the master antenna unit. The master antenna unit may be designated based on being at one end of the priority order.

The method may comprise generating the first interface address. The first interface address may be generated based on the hardware address of the communication interface. The first interface address may be a randomly generated interface address. The first interface address is may be link local address.

Identifying at least one other antenna unit using the self-discovery protocol may comprise sending one or more neighbour solicitation messages, receiving one or more neighbour advertisement message and building a neighbour cache of first interface addresses of the at least one other antenna unit.

The second interface addresses may form an antenna unit network.

The method may comprise assigning the respective subset of a set of third interface addresses to each of the at least one other antenna unit. The third interface addresses may form the client network.

Each antenna unit may comprise a wireless communications interface for communication with an external network, the method may comprise assigning a fourth interface address to the first communication interface, the second address allocation server may allocate the fourth interface address as a gateway address to at least one client device connected to the client network. The method may comprise assigning a fourth interface address to each of the at least one other antenna unit.

The method may comprise communicating with at least one other antenna unit using a second interface address to establish a heartbeat mechanism with the at least one other antenna unit, and in response to the heartbeat mechanism detecting that a second antenna unit is offline assigning the fourth interface address of the second antenna unit to the first communication interface of the first antenna unit.

The first, second and/or third interface addresses may be IP addresses. The first interface address may be an IPv6 address. The second interface addresses may be IPv4 addresses. The third interface addresses may be IPv4 addresses.

The at least one other antenna unit may be a plurality of other antenna units.

According to a second aspect of the present invention there is provided a first antenna unit provided on a vehicle, the vehicle comprising a plurality of antenna units, each antenna unit comprising a first communications interface having a hardware address, each first communication interface being connected to a communication network, the first antenna unit comprising a first communications interface having a hardware address, the first communication interface being connectable to a communication network, the first antenna unit being configured to: communicate over the communication network using a first interface address associated with the first communication interface to identify at least one other antenna unit using a self-discovery protocol, the first interface address being generated by the first antenna unit; communicate with the at least one other antenna unit to designate a master antenna unit based on a priority order of the antenna units; in response to the first antenna unit being designated the master antenna unit, generate a first address allocation server to allocate respective second interface addresses to the at least one other antenna unit to be used in communication between the plurality of antenna units; and generate a second address allocation server to allocate respective third interface addresses from a subset of a set of third interface addresses to at least one client device connected to the client network, different subsets of the set of third interface addresses being allocated to second address allocation servers of respective antenna units.

BRIEF DESCRIPTION OF THE DRAWINGS

The present invention will now be described by way of example with reference to the accompanying drawings. In the drawings.

DETAILED DESCRIPTION

Figure 1:
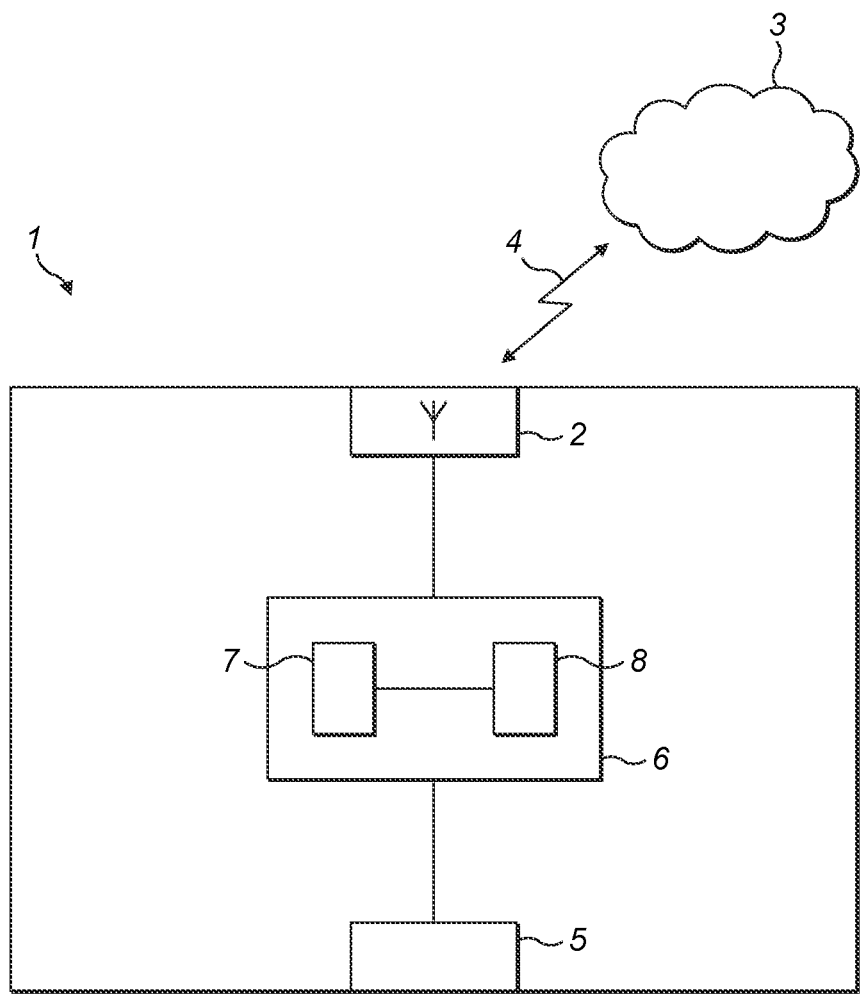
FIG. 1 shows an antenna unit.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for establishing a client network on a vehicle, the vehicle comprising a plurality of antenna units, each antenna unit comprising a first communications interface having a hardware address, each first communication interface being connected to a communication network. The method comprising, at a first antenna unit: communicating over the communication network using a first interface address associated with the first communication interface to identify at least one other antenna unit using a self-discovery protocol, the first interface address being generated by the first antenna unit; and communicating with the at least one other antenna unit to designate a master antenna unit based on a priority order of the antenna units. The method further comprises in response to the first antenna unit being designated the master antenna unit, generating a first address allocation server to allocate respective second interface addresses to the at least one other antenna unit to be used in communication between the plurality of antenna units; and generating a second address allocation server to allocate respective third interface addresses from a subset of a set of third interface addresses to at least one client device connected to the client network, different subsets of the set of third interface addresses being allocated to second address allocation servers of respective antenna units.

The present invention also relates to a first antenna unit provided on a vehicle, the vehicle comprising a plurality of antenna units, each antenna unit comprising a first communications interface having a hardware address, each first communication interface being connected to a communication network, the first antenna unit comprising a first communications interface having a hardware address, the first communication interface being connectable to a communication network. The first antenna unit may be configured to be provided on a vehicle. The first antenna unit is configured to: communicate over the communication network using a first interface address associated with the first communication interface to identify at least one other antenna unit using a self-discovery protocol, the first interface address being generated by the first antenna unit; and communicate with the at least one other antenna unit to designate a master antenna unit based on a priority order of the antenna units. The first antenna unit is further configured to: in response to the first antenna unit being designated the master antenna unit, generate a first address allocation server to allocate respective second interface addresses to the at least one other antenna unit to be used in communication between the plurality of antenna units; and generate a second address allocation server to allocate respective third interface addresses from a subset of a set of third interface addresses to at least one client device connected to the client network, different subsets of the set of third interface addresses being allocated to second address allocation servers of respective antenna units.

FIG. 1 shows an antenna unit 1.

The antenna unit 1 comprises a wireless communication interface 2. The wireless communications interface 2 may be used by the antenna unit 1 for communication with an external network 3. The wireless communication interface 2 communicate with a cellular network 4 to enable communication with the external network 3. The wireless communication interface 2 comprises a transmit and receive section and an antenna. The antenna may be formed of multiple components for instance the antenna may be in the form of a MIMO antenna.

The antenna unit 1 comprises a first communication interface 5. The first communication interface 2 has a hardware address associated with it. The hardware address may be loaded into the first communication interface 2 upon manufacture of the first communication interface. Alternatively, the hardware address may be generated by the antenna unit upon start-up or may be loaded into the first communication interface 2 upon first start-up and then that address remains as the hardware interface until the first communication interface 2 is reconfigured. The hardware address may be a MAC address. The hardware address may be a physical address. The hardware address may be an identifier used by the first communication interface 2 to communicate at the data link layer. The data link layer may be layer 2 of the OSI model of computer networking.

The antenna unit 1 comprises a processing section 6. The antenna unit 1 is configured to implement methods described herein for establishing a client network. These methods can be implemented and controlled by the processing section 6. The processing section 6 could perform its methods using dedicated hardware, using a general purpose processor executing software code, or using a combination of the two. A processor 7 executes software code stored in a non-transient way in software memory 8 in order to perform its methods. The processing section may comprise one or more processors 7 and one or more memories 8.

The wireless communication interface 2 and the first communication interface 5 are connected to the processing section 6. In this way processing section 6 is capable of sending and receiving data over the wireless communication interface 2 and/or the first communication interface 5.

Figure 2:
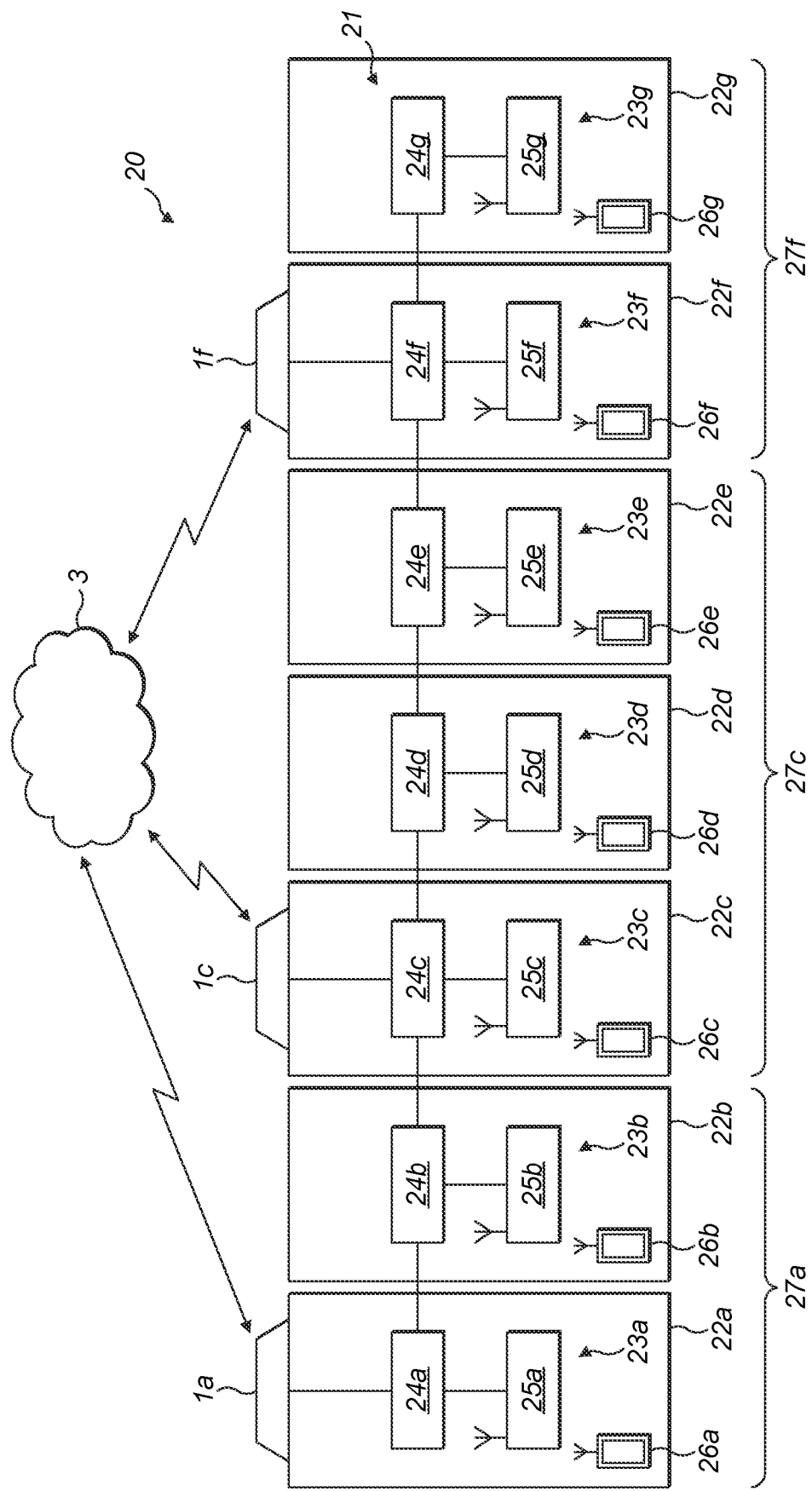
FIG. 2 shows a vehicle comprising a communication network and a plurality of antenna units.

FIG. 2 shows a vehicle 20 comprising a communication network 21. The vehicle 20 comprises a plurality of vehicle segments 22a-g. In the case of a train 20, the vehicle segments 22a-g may be carriages 22a-g. Some of the segments 22 may comprise a power source that enables the segment 22 to be driven. Other segments 22 may simply be capable of being moved by other of the segments 22. In the following discussion, the example vehicle 20 of a train 20 is used together with the vehicle segments 22 being carriages 22. It will however be appreciated that alternative vehicles may have a client network deployed on them in a similar manner to that described in relation to the train 20. For example, the vehicle may be a multi-unit bus or coach that are connected together.

Each carriage 22 comprises a portion of the communication network 23a-g. When the carriages 22 of the train 20 are joined together the portions of the communication network 23 may be linked together by a network link between each of the carriages 22. This network link may be a physical connection between the carriages 22. The network link can be connected between the carriages 22 when the carriages 22 are coupled together. Alternatively, the network link may be a wireless connection between the carriages 22.

Each carriage 22 comprises a network switch 24a-g. The network switch 24 is configured to forward data between the devices connected to that network switch 24. The network switch 24 is configured to provide power to devices connected to the network switch 24. The devices may request that power be provided to them over the connection between the network switch 24 and the device connected to the network switch 24. In this way, the network switch 24 may be a Power over Ethernet switch. Whilst only one network switch 24 is pictured in each carriage 22, the carriage 22 may comprise a plurality of network switches 24 should it be required to provide the required connectivity to the carriage 22. Advantageously, only one network switch 24 is provided per carriage 22 as this simplifies the network present in each carriage 22 and means less space needs to be found for the network hardware.

Each carriage 22 comprises a wireless access point 25a-g. The wireless access point 25 is configured to communicate with at least one client device 26a-g. The client device 26 may be located within the carriage 22. The wireless access point 25 is configured to provide access to the communication network 21 to the client devices 26. The wireless access point 25 may draw power from the network switch 24. The carriage 22 may comprise more than one wireless access point 25. For instance, if the carriage 22 is very long, or can accommodate a large number of users, then multiple wireless access points may be required to provide adequate coverage and/or bandwidth.

The carriage may comprise physical network ports (not pictured) which are connected to the network switch 24 to also provide access to the communication network 21. Advantageously, the access to the communication network 21 is provided by the one or more wireless access points 25 present in the carriage 22 as this simplifies the network cabling present within the carriage 22.

The train 20 comprises a plurality of antenna units 1. In FIG. 2, three antenna units are pictured 1a, 1c and 1f. The antenna unit 1 of a carriage 22 is connected to network switch 24. The antenna unit 1 may draw power from the network switch 24. Antenna unit 1 being powered by the network switch 24 is advantageous as it simplifies the cabling requirements to the antenna unit 1. The antenna unit 1 is connected to the network switch 24 by the first communication interface 5 of the antenna unit 1. Antenna unit 1 is therefore connected to the communication network 21. The antenna unit 1 is connected to the communication network 21 by the first communication interface 5. Each antenna unit 1 can therefore provide access to an external network 3 to client devices 26 associated with the train 20.

As the antenna units 1 are located along the train 20, there will be a most efficient antenna unit 1 for a respective client device 26 to communicate with to gain access to the external network 3. Therefore, the communication network 21 may be divided logically into a set of network segments. These segments may be related to which of the antenna units 1 responds first to a client device 26 attempting to join the network. This may indicate that a particular antenna unit 1 has more capacity than other antenna units and so is the most efficient one to communicate with at that point. In some instances, these segments will be related to the distance within the communication network 21 from a respective antenna unit 1. The distance may be measured by the latency in the connection between a client device 26 and an antenna unit 1 as the nearer antenna unit 1 is likely to receive signals from the client device 26 slightly quicker and so respond to an initial request from a client device 26 slightly quicker. A network segment 27 associated with each of the antenna units 1a, 1c and 1f are shown in FIG. 2. A network segment 27a is associated with antenna unit 1a. A network segment 27c is associated with antenna unit 1c. A network segment 27f is associated with antenna unit 1f. Whilst the network segments are shown as being separate from each other physically along the train 20, it will be understood that there will likely be at least some overlap in the physical network. For instance, as the carriage 22b is equally spaced between the antenna units 1a and 1c there is likely to be some client devices 26 located in carriage 22b that connect to antenna unit 1a and some that connect to antenna unit 1c. Therefore, some client devices 26 will be located in segment 27a and some client devices 26 will be located in segment 27c. By dividing the network into segments, each antenna unit 1 should have a balanced number of client devices 26 attempting to access the external network via that particular antenna unit 1. The segments may in some cases run along the length of the train 20.

The carriages 22 of the train 20 are configured so that they can be disconnected and reconnected as required to form the required configuration and length of the train 20. This means that the communication network 21 and antenna units 1 that are part of the train 20 may change over time. In addition, the train may be powered off when in a station or depot which would mean that the antenna units 1 would also be powered off. When the train is reconfigured or powered on, the antenna units 1 need to form a client network together so that the client devices can access the external network. It is advantageous if this assembly of the network can occur without manual intervention of an operative as then the train can be reconfigured without external reconfiguration of the network system.

Figure 3:
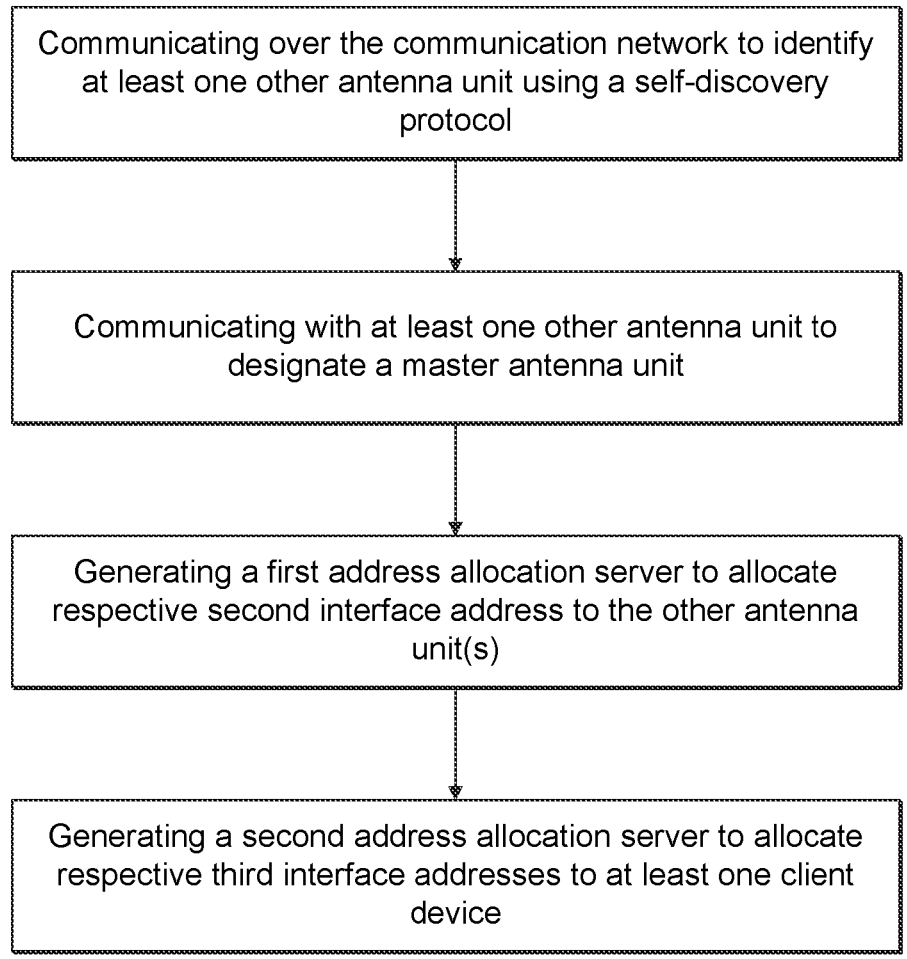
FIG. 3 shows a flow diagram of a method by which a client network is established on a vehicle.

FIG. 3 shows a flow diagram of the method by which a client network is established on a vehicle 1. The method is implemented by the antenna units 1 to establish a client network on the vehicle 1. The method that is implemented by the antenna units 1 may provide access to an external network. Access to the external network is via the antenna units 1. The method shown in FIG. 3 is implemented by a first antenna unit 1. The antenna unit 1 communicates with other antenna units 1 to establish a client network on the vehicle 1.

As shown in 31, the method for establishing a client network comprises communicating over the communication network to identify at least one other antenna unit 1 using a self-discovery protocol. The first antenna unit 1 communicates over the communication network 21 using the communication interface 5 using a first interface address associated with the communication interface 5. The first interface address is generated by the first antenna unit 1. The method may comprise generating the first interface address.

The first interface address may be generated based on the hardware address of the first communication interface. The calculation to derive the first interface address from the hardware address of the first communication interface may be calculated in the following way:

Where the hardware address has the format XX:XX:XX:XX:XX:XX, the first interface address may be calculated as fe80::xyxx:xxff:fexx:xxxx. Where fe80:: is prepended to the hardware address, ff:fe is inserted in the middle and y=X XOR 2. y=X XOR 2 means that the second bit from the right of relevant X of the hardware address is inverted. For example, de becomes 11011110, invert the bit at index 6 (counting from 0): 11011110->11011100, and convert octet back to hexadecimal: 01010000->dc. Alternatively, the first interface address may be a randomly generated interface address. The first interface address may be an IP address. The first interface address may be a IPv6 address. The first interface address may be a link local address. The first interface address may be a IPv6 link local address.

The self-discovery protocol may provide for a set of messages that enable the antenna units 1 to build up a list of addresses of the other antenna units 1 on the communication network 21. The self-discovery protocol may be the IPv6 neighbour discovery protocol. This may be as defined by RFC 4861. For instance, the self-discovery protocol may comprise:

A neighbour solicitation message. The neighbour solicitation message may request interface addresses of other devices on the communication network. The message may therefore request interface addresses of at least one other antenna unit 1 that is connected to the communication network 21. The neighbour solicitation message may be a broadcast message.

A neighbour advertisement message. The neighbour advertisement message may send the interface address of the first antenna unit 1 to other devices on the communication network. The message may therefore send the first interface address to at least one other antenna unit 1 that is connected to the communication network 21. The neighbour advertisement message may be addressed to a particular other device or may be broadcast message.

The self-discovery protocol allows the first antenna unit to build up a neighbour cache. I.e. a list of the interface addresses of the other antenna units 1. This enables the first antenna unit 1 to communication with the other antenna units 1. This is because the first antenna unit now knows how to address messages to the other antenna units 1.

The first antenna unit may identify at least one other antenna unit using the self-discovery protocol by sending one or more neighbour solicitation messages. The first antenna unit may receive one or more neighbour advertisement messages. These neighbour advertisement messages comprise the respective interface addresses of communication interfaces of respective other antenna units 1. The first antenna unit 1 builds a neighbour cache which includes the interface addresses of the other antenna unit(s). The first antenna unit 1 may identify a plurality of other antenna units 1.

As shown in 32, the method for establishing a client network comprises communicating with at least one other antenna unit 1 to designate a master antenna unit. The method may comprise communicating with a plurality of other antenna units 1. The master is designated based on a priority order of the antenna units. The master may be selected as the antenna unit at one end of the priority order. The antenna unit with the highest priority may be selected. The antenna unit with the lowest priority may be selected.

The priority order may be randomly assigned to the antenna units. Alternatively, the master may be designated based on the respective hardware addresses of the first communication interfaces of the at least one other antenna unit. The priority order may be formed by ordering the hardware addresses in numerical order. The master may be selected as the antenna unit having a hardware address at one end of the order. The antenna unit having the highest or lowest hardware address may be selected as the master.

As shown in 33, the method for establishing a client network comprises generating a first address allocation server to allocate respective second interface addresses to the other antenna unit(s) 1. The first address allocation server is generated by the first antenna unit 1 in response to the first antenna unit 1 being designated as the master antenna unit. The first antenna unit 1 is designated as the master antenna unit when the first antenna unit 1 is in the correct position in the priority order of the antenna units 1. The first address allocation server may allocate respective second interface addresses to at least one other antenna unit. The first address allocation server may allocate respective second interface addresses to a plurality of other antenna units.

The first address allocation server allocates respective second interface addresses to the other antenna units 1. These second interface addresses are used in communications between the plurality of antenna units. The first address allocation server may be a DHCP server. The first address allocation server has a set of second interface addresses that it can allocate to the plurality of antenna units. The second interface addresses are used to form an antenna unit network. The antenna unit network may be a virtual LAN (VLAN) operating over the communication network 21. The antenna units may communicate with the switches 24 to join an antenna unit VLAN for communications using the second interface addresses. The first address allocation server may also set other parameters of the antenna unit network such as a default gateway and DNS servers. These parameters are passed to the antenna units 1 so that the antenna units 1 can configure those settings for the first communication interface 1.

The first address allocation server may issue IP addresses as the second interface addresses. In this way, the third interface addresses may be IP addresses. The first address allocation server may issue IPv4 addresses as the second interface addresses. In this way, the second interface addresses may be IPv4 addresses. The first address allocation server may issue IPv6 address as the second interface addresses. In this way, the second interface addresses may be IPv6 addresses.

The method for establishing a client network may comprise allocating respective second interface addresses to at least one other antenna unit. The method for establishing a client network may comprise allocating respective second interface addresses to a plurality of other antenna units.

The antenna unit network can be used for inter-antenna unit communications to enable the antenna units to function as a resilient set of gateways for transmissions between the communication network 21 and the external network 3.

As shown in 34, the method for establishing a client network comprises generating a second address allocation server to allocate respective third interface addresses to at least one client device 26. The client devices 26 are connected to the client network. The second address allocation server allocates a subset of a set of third interface addresses. Each antenna unit 1 has a different subset of the set of third interface addresses to allocate. In this way, different subsets of the set of third interface addresses are allocated to second address allocation servers of respective antenna units. The second address allocation server of the first antenna unit allocates a respective subset of the set of third interface addresses.

The method may comprise the first antenna unit assigning the respective subset of the set of third interface addresses to each of the other antenna unit(s). The assigning may occur by the first antenna unit sending an address assignment message to each other antenna unit over the antenna unit network.

The second address allocation server may issue IP addresses as the third interface addresses. The second address allocation server may issue IPv4 addresses as the third interface addresses. In this way, the third interface addresses may be IPv4 addresses. The first address allocation server may issue IPv6 address as the third interface addresses. In this way, the third interface addresses may be IPv6 addresses.

The second address allocation server allocates respective third interface addresses to client device(s) 26. These third interface addresses are used in communications between the client device(s) 26 and the antenna units 1. The second address allocation server may be a DHCP server. The third interface addresses are used to form a client network. The client network may be a virtual LAN (VLAN) operating over the communication network 21. The client devices 26 can communicate with the antenna units 1 over the client network. The client devices 26 can access the external network via at least one of the antenna units 1. The wireless access points 25 (and/or wired connection points) may default to sending traffic over the client network when received by the client devices connected to those points. The wireless access points 25 (and/or wired connection points) may default to sending traffic over the client network VLAN when received by the client devices connected to those points. The antenna units 1 may be configured to send traffic over the client network when relaying traffic from the external network. The antenna units 1 may be configured to send traffic over the client network VLAN when relaying traffic from the external network. In this way, the client devices 26 can send and receive data to and from the external network.

The method for establishing a client network may comprise assigning a fourth interface address to the first communication interface of the antenna unit 1. The master antenna unit may assign a fourth interface address to each of the other antenna unit(s) 1. The master antenna unit may send an assignment message including the respective further interface address to each of the other antenna unit(s) 1. The assignment message may be sent over the antenna unit network.

The fourth interface address is a gateway address for the antenna unit 1. The fourth interface address is used to route traffic between the client network and the external network. Each antenna unit 1 routes traffic using the fourth interface address. The antenna unit 1 may route traffic directly from the client network to the external network using the wireless communication interface 2 that is part of the antenna unit 1. Alternatively, or as well as, the antenna unit 1 may route traffic via one or more of the other antenna units 1. The antenna unit 1 may route traffic via a plurality of other antenna units 1. The antenna units 1 may make use of MPTCP to route traffic via multiple paths. The antenna units may use the methods disclosed in GB2523394 to route traffic using MPTCP.

The second address allocation server may also set other parameters of client network such as a default gateway and DNS servers. The second address allocation server of the first antenna unit may set the fourth interface address of the first antenna unit as the gateway address when allocating the third interface addresses to client devices. In this way, the client devices that receive a third interface address of the subset being allocated by the first antenna unit also receive the fourth interface address of the first antenna unit as a gateway address. The second address allocation server of each antenna unit may set the fourth interface address of the respective antenna unit as the gateway address when allocating the third interface addresses to the client devices. In this way, the client devices that receive a third interface address of the subset being allocated by that antenna unit also receive the fourth interface address of that antenna unit as a gateway address.

The allocation of the subsets of third interface addresses and the gateway addresses is advantageous because it balances the load across the plurality of antenna units 1.

The second address allocation server may issue IP addresses as the third interface addresses. In this way, the third interface addresses may be IP addresses. The second address allocation server may issue IPv4 addresses as the third interface addresses. In this way, the third interface addresses may be IPv4 addresses. The first address allocation server may issue IPv6 address as the third interface addresses. In this way, the third interface addresses may be IPv6 addresses.

The fourth interface addresses may be virtual interface addresses. The fourth interface addresses by the virtual IP addresses. The fourth interface addresses may be capable of being reassigned from one antenna unit to another antenna unit. The fourth interface addresses may be capable of being reassigned from a primary antenna unit to another antenna unit if the primary antenna unit fails.

The method may comprise communicating with the at least one other antenna unit to establish a heartbeat mechanism with the at least one other antenna unit. The heartbeat mechanism communications may be sent using the second interface address. In this way, the heartbeat mechanism communications may be sent over the antenna unit network. The heartbeat mechanism may comprise sending a heartbeat message to the other antenna unit(s) on a periodic basis. The heartbeat mechanism may also comprise logging the reception of heartbeat messages from the other antenna unit(s). If another antenna unit misses a predetermined number of heartbeat messages then the antenna unit is deemed to be offline. If the other antenna unit is offline then the fourth interface address of the offline antenna unit is reassigned to an online antenna unit. If the other antenna unit is offline then the fourth interface address of the offline antenna unit may be reassigned to the first antenna unit. In this way, in response to the heartbeat mechanism detecting a second antenna unit is offline the fourth interface address is assigned to the first communication interface of the first antenna unit. The fourth interface address may be assigned to another antenna unit in response to the second antenna unit being offline.

If the second antenna unit is deemed to be back online, then the fourth interface address of the second antenna unit is returned to the second antenna unit and unassigned from the first communication interface of the first antenna unit.

The movement of the fourth interface addresses between the antenna units improves the resilience of the client network routing to the external network 3.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for establishing a client network on a vehicle, the vehicle comprising a plurality of antenna units, each antenna unit comprising a first communications interface having a hardware address, each first communication interface being connected to a communication network, the method comprising, at a first antenna unit:
   communicating over the communication network using a first interface address associated with the first communication interface to identify at least one other antenna unit using a self-discovery protocol, the self-discovery protocol being a neighbour discovery protocol, the first interface address being generated by the first antenna unit;
   communicating with the at least one other antenna unit to designate a master antenna unit based on a priority order of the antenna units;
   in response to the first antenna unit being designated the master antenna unit, generating a first address allocation server to allocate respective second interface addresses to the at least one other antenna unit to be used in communication between the plurality of antenna units; and
   generating a second address allocation server to allocate respective third interface addresses from a subset of a set of third interface addresses to at least one client device connected to the client network, different subsets of the set of third interface addresses being allocated to second address allocation servers of respective antenna units.

2. A method according to claim 1, wherein the priority order is based on the respective hardware addresses of the first communication interfaces.

3. A method according to claim 1, wherein the antenna having the highest or lowest hardware address is designated as the master antenna unit.

4. A method according to claim 1, wherein the master antenna unit is designated based on being at one end of the priority order.

5. A method according to claim 1, the method comprising generating the first interface address.

6. A method according to claim 1, wherein the first interface address is generated based on the hardware address of the communication interface.

7. A method according to claim 1, wherein the first interface address is a randomly generated interface address.

8. A method according to claim 1, wherein the first interface address is a link local address.

9. A method according to claim 1, wherein identifying at least one other antenna unit using the self-discovery protocol comprises sending one or more neighbour solicitation messages, receiving one or more neighbour advertisement message and building a neighbour cache of first interface addresses of the at least one other antenna unit.

10. A method according to claim 1, the method comprising assigning the respective subset of a set of third interface addresses to each of the at least one other antenna unit.

11. A method according to claim 1, wherein each antenna unit comprises a wireless communications interface for communication with an external network, the method comprises assigning a fourth interface address to the first communication interface, the second address allocation server allocating the fourth interface address as a gateway address to at least one client device connected to the client network.

12. A method according to claim 11, the method comprising assigning a fourth interface address to each of the at least one other antenna unit.

13. A method according to claim 1, the method comprising communicating with at least one other antenna unit using a second interface address to establish a heartbeat mechanism with the at least one other antenna unit, and in response to the heartbeat mechanism detecting that a second antenna unit is offline assigning the fourth interface address of the second antenna unit to the first communication interface of the first antenna unit.

14. A method according to claim 1, wherein the first, second and/or third interface addresses are IP addresses.

15. A method according to claim 1, wherein the first interface address is an IPV6 address.

16. A method according to claim 1, wherein the at least one other antenna unit is a plurality of other antenna units.

17. A first antenna unit provided on a vehicle, the vehicle comprising a plurality of antenna units, each antenna unit comprising a first communications interface having a hardware address, each first communication interface being connected to a communication network, the first antenna unit comprising a first communications interface having a hardware address, the first communication interface being connectable to a communication network, the first antenna unit being configured to:
   communicate over the communication network using a first interface address associated with the first communication interface to identify at least one other antenna unit using a self-discovery protocol, the self-discovery protocol being a neighbour discovery protocol, the first interface address being generated by the first antenna unit;

communicate with the at least one other antenna unit to designate a master antenna unit based on a priority order of the antenna units;

in response to the first antenna unit being designated the master antenna unit, generate a first address allocation server to allocate respective second interface addresses to the at least one other antenna unit to be used in communication between the plurality of antenna units; and generate a second address allocation server to allocate respective third interface addresses from a subset of a set of third interface addresses to at least one client device connected to the client network, different subsets of the set of third interface addresses being allocated to second address allocation servers of respective antenna units.

* * * * *